(12) United States Patent
Kinoshita et al.

(10) Patent No.: US 12,306,673 B2
(45) Date of Patent: May 20, 2025

(54) ELECTRONIC APPARATUS, REMOVAL SCREW, AND COVER REMOVING METHOD

(71) Applicant: LENOVO (SINGAPORE) PTE. LTD., Singapore (SG)

(72) Inventors: Hiroaki Kinoshita, Yokohama (JP);
Daisuke Takahashi, Yokohama (JP);
Tetsuya Sano, Yokohama (JP);
Takehito Yamauchi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 230 days.

(21) Appl. No.: 18/176,511

(22) Filed: Mar. 1, 2023

(65) Prior Publication Data
US 2023/0367370 A1 Nov. 16, 2023

(30) Foreign Application Priority Data

May 12, 2022 (JP) .................................. 2022078863

(51) Int. Cl.
*G06F 1/16* (2006.01)
(52) U.S. Cl.
CPC .......... *G06F 1/1656* (2013.01); *G06F 1/1652* (2013.01)

(58) Field of Classification Search
CPC ..... G06F 1/1637; G06F 1/1652; G06F 1/1656
See application file for complete search history.

(56) References Cited

U.S. PATENT DOCUMENTS

| 2020/0249717 A1* | 8/2020 | Shibayama | G06F 1/1652 |
| 2020/0275563 A1* | 8/2020 | Watamura | E05D 3/14 |
| 2022/0078924 A1* | 3/2022 | Ushioda | F16B 41/002 |

FOREIGN PATENT DOCUMENTS

JP 2022046022 A 3/2022

* cited by examiner

*Primary Examiner* — Allen L Parker
*Assistant Examiner* — Elisa Sasserath
(74) *Attorney, Agent, or Firm* — SHIMOKAJI IP (57) ABSTRACT

An electronic apparatus includes a cover fixed with an adhesive tape along an edge of a first chassis, a female screw hole formed on a side wall, and a protruding portion protruding from an inner surface of the cover. The protruding portion has an inclined surface that is located on an extension of the female screw hole and of which a protrusion amount increases in a direction away from the side wall. A removal screw includes a head, a male screw portion protruding from the head and screwed into the female screw hole, a cylindrical portion having a diameter smaller than that of the male screw portion and further protruding from the male screw portion, and a spherical surface portion forming a tip end of the cylindrical portion.

4 Claims, 10 Drawing Sheets

ELECTRONIC APPARATUS, REMOVAL SCREW, AND COVER REMOVING METHOD

BACKGROUND OF THE INVENTION

Field of the Invention

The present invention relates to an electronic apparatus including a cover fixed with an adhesive material along an edge of a chassis, a removal screw for removing the cover from the chassis of the electronic apparatus, and a cover removing method for removing the cover from the chassis of the electronic apparatus.

Description of the Related Art

In the chassis of an electronic apparatus such as a notebook-type personal computer (laptop PC) and a tablet-type personal computer (tablet-type PC), one surface of the chassis is covered with a cover. Devices such as a motherboard are stored inside the chassis, and it is necessary to remove the cover at the time of maintenance. Generally, the cover is fixed to the chassis with a plurality of screws (Japanese Unexamined Patent Application Publication No. 2022-046022), and the cover is removed from the chassis by removing the screws.

SUMMARY OF THE INVENTION

By the way, it is not desirable for the design to have a plurality of screws on the cover. Therefore, it has been studied to fix the cover along the edge of the chassis with an adhesive material. However, the cover fixed by the adhesive material is difficult to remove.

The present invention has been made in view of the above problems, and the purpose of the present invention is to provide an electronic apparatus having a suitable appearance, a removal screw, and a cover removing method for appropriately removing a cover from a chassis.

In order to solve the above-described problems and achieve the purpose, an electronic apparatus according to the first aspect of the present invention is an electronic apparatus including a chassis, a cover fixed to the chassis with an adhesive material along an edge of the chassis, a female screw hole formed on a side wall of the chassis, and a protruding portion protruding from an inner surface of the cover, in which the protruding portion has an inclined surface that is located on an extension of the female screw hole and of which a protrusion amount increases toward a direction away from the side wall.

In addition, a removal screw according to the second aspect of the present invention is a removal screw for removing a cover fixed to a chassis of an electronic apparatus with an adhesive material, the screw including a head, a male screw portion protruding from the head and screwed into a female screw hole, a cylindrical portion having a diameter smaller than that of the male screw portion and further protruding from the male screw portion, and a spherical surface portion forming a tip end of the cylindrical portion.

Furthermore, a cover removing method according to the third aspect of the present invention is a method for removing a cover fixed to a chassis of an electronic apparatus with an adhesive material by using a screw, the method including a step of screwing the screw into a female screw hole formed on a side wall of the chassis, and a step of lifting the cover by further screwing the screw into a protruding portion located on an extension of the female screw hole and protruding from an inner surface of the cover and by pushing up an inclined surface formed on the protruding portion by a spherical surface portion formed at a tip end of the screw.

According to the above-described aspect of the present invention, a protruding portion is provided on the extension of the female screw hole, and an inclined surface of the protruding portion has a protrusion amount increasing in a direction away from the side wall, thereby appropriately removing the cover from the chassis by pressing a tip end of the removal screw on the inclined surface. The cover can be adhesively fixed with an adhesive material, screwing is not required, a suitable appearance can be obtained.

DETAILED DESCRIPTION OF THE INVENTION

Hereinafter, an electronic apparatus 10, a removal screw 70, and a cover removing method according to an embodiment of the present invention will be described in detail with reference to drawings. The present invention is not limited to this embodiment.

Figure 1:
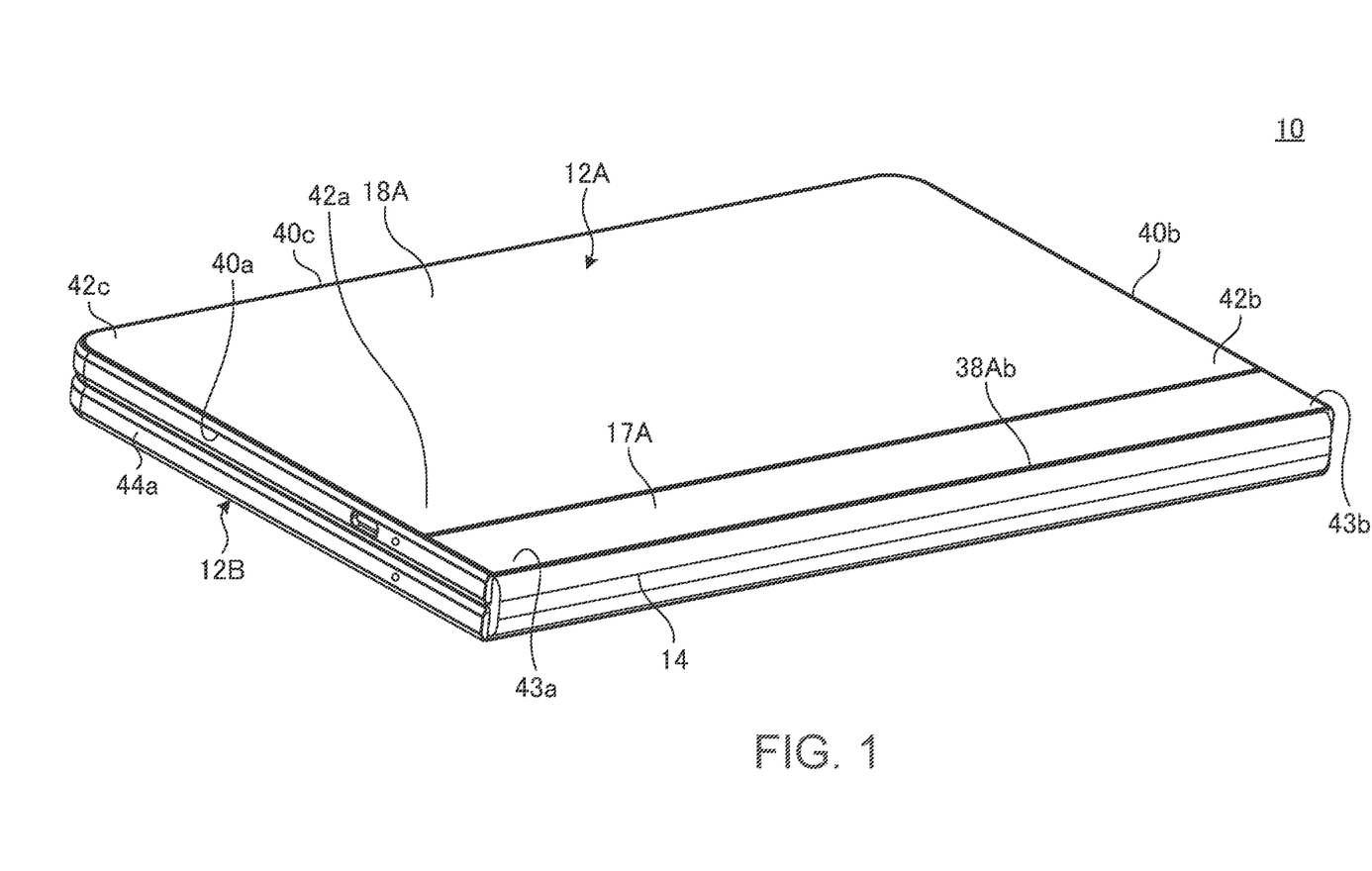
FIG. 1 is a perspective view schematically showing a state in which an electronic apparatus according to an embodiment is closed in a 0-degree posture.
Figure 2:
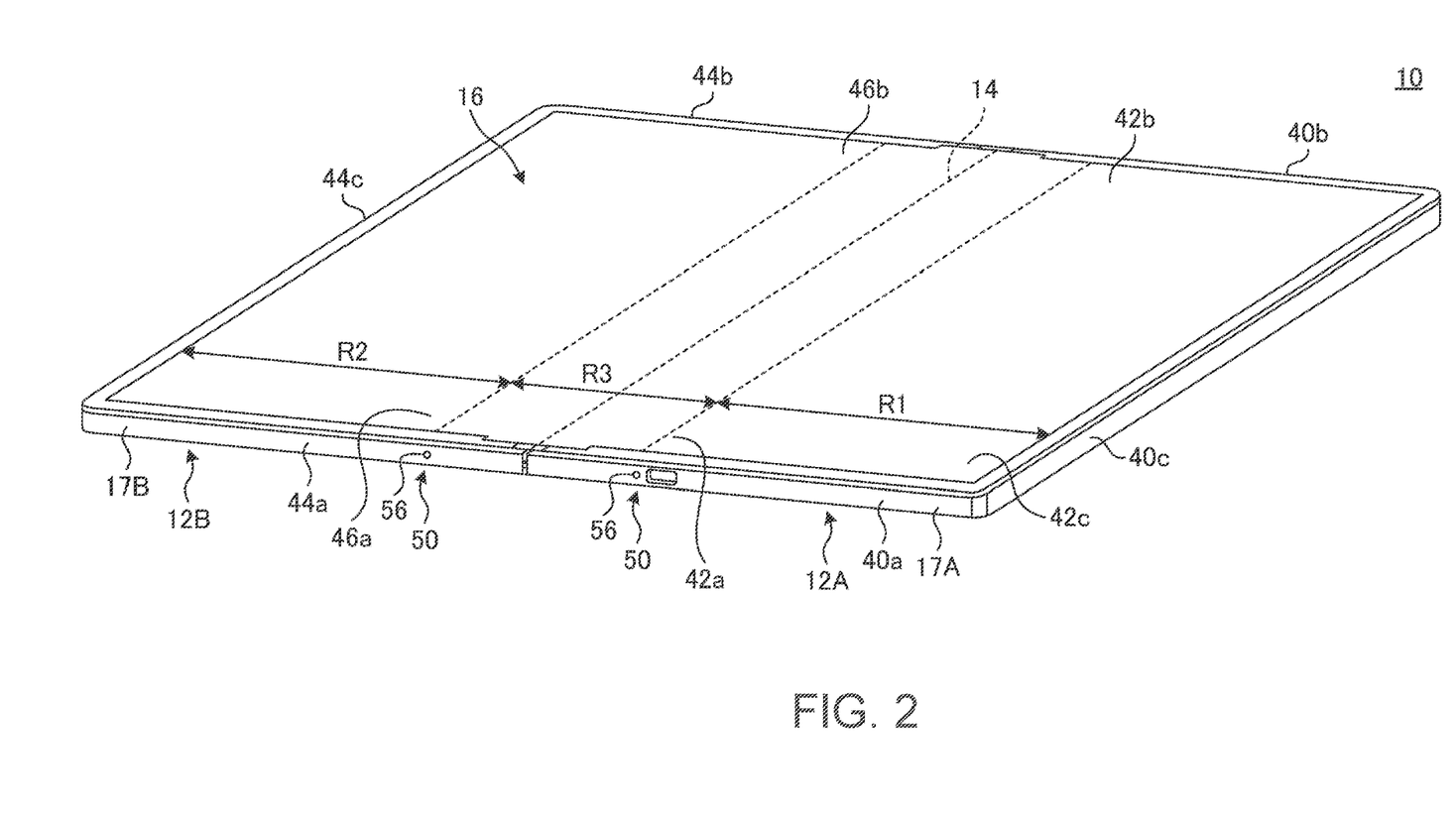
FIG. 2 is a perspective view schematically showing a state in which the electronic apparatus shown in FIG. 1 is opened in a 180-degree posture.

FIG. 1 is a perspective view schematically showing a state in which the electronic apparatus 10 according to the embodiment is closed in a 0-degree posture. FIG. 2 is a perspective view schematically showing a state in which the electronic apparatus 10 shown in FIG. 1 is opened in a 180-degree posture. As shown in FIGS. 1 and 2, the electronic apparatus 10 includes a first chassis 12A and a second chassis 12B, a hinge device 14, and a display 16. Each of the chassis 12A and 12B is disposed adjacent to each other. On each of the chassis 12A and 12B, various electronic components such as a motherboard on which a CPU is mounted, a battery device, an antenna module, and a communication module are appropriately mounted.

The first chassis 12A includes a frame member 17A and a cover 18A. The frame member 17A is a rectangular frame-shaped member having side walls 40a, 40b, and 40c formed on three sides other than an adjacent edge (one edge) 38A adjacent to the second chassis 12B. The side walls 40a and 40b are side walls orthogonal to the adjacent edge 38A, and the side wall 40c is a wall on the opposite side to the adjacent edge 38A. The cover 18A is a plate-shaped member that closes the opening on the back surface of the frame member 17A, and covers almost the entire back surface of the first chassis 12A. Both ends of a side 18Aa along the adjacent edge 38A in the cover 18A are referred to as an inner end portion (end portion of the side along one edge) 42a and an inner end portion 42b. The inner end portion 42a is on the side of the side wall 40a, and the inner end portion 42b is on the side of the side wall 40b. The inner end portions 42a and 42b are located at positions biased to the other side by the width of the hinge device 14 or the like with respect to corner portions 43a and 43b (see FIG. 1) of the electronic apparatus 10 in a 0-degree posture. The inner end portions 42a and 42b are located close to the corners of the electronic apparatus 10 in a 0-degree posture, but are located substantially in the middle of the left and right sides in FIG. 2 in a 180-degree posture.

The second chassis 12B includes a frame member 17B having side walls 44a, 44b, and 44c formed on three sides other than an adjacent edge (one edge) 38B adjacent to the first chassis 12A, and a cover 18B closing the opening on the back surface of the frame member 17B. The side walls 44a and 44b are side walls orthogonal to the adjacent edge 38B, and the side wall 44c is a wall on the opposite side to the adjacent edge 38B. The side wall 44a is a wall on the same side as the side wall 40a, and the side wall 44b is a wall on the same side as the side wall 40b. The cover 18A is a plate-shaped member that closes the opening on the back surface of the frame member 17A, and covers almost the entire back surface of the second chassis 12B. Both ends of a side of the cover 18B along the adjacent edge 38B are referred to as end portions 46a and end portions 46b. The end portion 46a is on the side of the side wall 44a, and the end portion 46b is on the side of the side wall 44b.

Each of the members 17A, 17B, 18A, and 18B is made of, for example, a metal member such as stainless steel, magnesium, or aluminum, or a fiber-reinforced resin plate containing reinforcing fibers such as carbon fiber.

The angular postures between the chassis 12A and 12B are described by calling the state of the chassis being laminated so as to overlap each other in the face direction a 0-degree posture (see FIG. 1) and the state of being the chassis being arranged in the direction perpendicular to the face direction a 180-degree posture (see FIG. 2). The hinge device 14 connects the chassis 12A and 12B so that the chassis are relatively rotatable between the 0-degree posture and the 180-degree posture. The hinge device 14 also functions as a spine cover that hides the gap between the adjacent edges 38A and 38B formed in the 0-degree posture shown in FIG. 1. The display 16 extends between the chassis 12A and 12B.

In the 0-degree posture shown in FIG. 1, the chassis 12A and 12B are in a state of being folded in half. The display 16 is a paper-like flexible display formed of an organic EL. In the 0-degree posture, the display 16 is disposed so that a region R1 on the first chassis 12A side and a region R2 on the second chassis 12B side shown in FIG. 2 face each other, and a bent region R3 which is a boundary area between the regions R1 and R2 is bent in an arc shape. In the 180-degree posture shown in FIG. 2, the chassis 12A and 12B are disposed side by side on the left and right sides of each other. At this time, in the display 16, the regions R1 and R2 and the bent region R3 are disposed side by side on a plane to form one flat plate shape as a whole. In the display 16, the region R1 is relatively fixed with respect to the first chassis 12A, and the region R2 is relatively fixed with respect to the second chassis 12B. The bent region R3 of the display 16 is relatively movable with respect to the chassis 12A and 12B.

Figure 3:
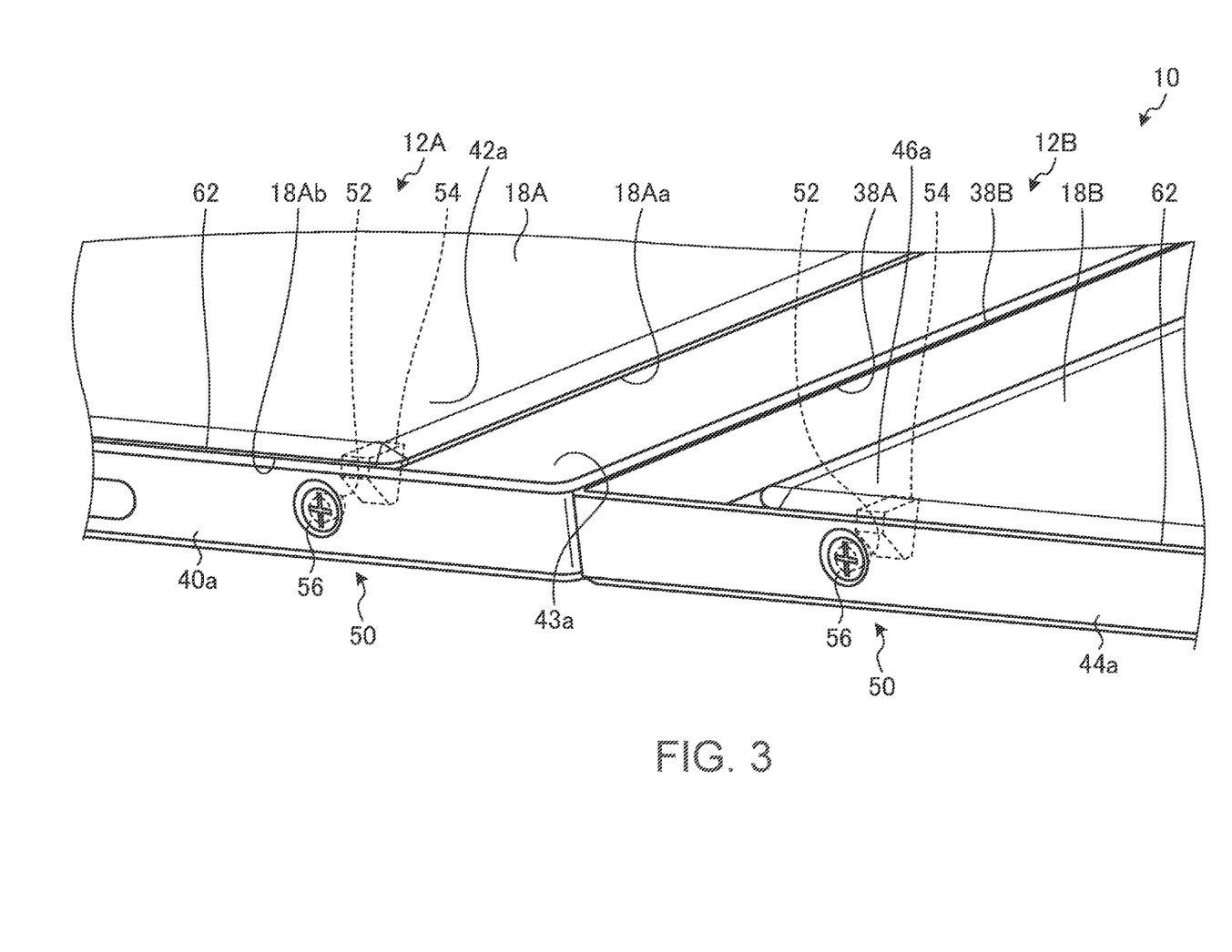
FIG. 3 is a lateral enlarged perspective view of the electronic apparatus.

FIG. 3 is a lateral enlarged perspective view of the electronic apparatus 10. As shown in FIG. 3, a cover removing mechanism 50 is provided in the vicinity of the inner end portion 42a and in the vicinity of the end portion 46a, respectively. The cover removing mechanism 50 and the peripheral portions thereof in the first chassis 12A and the second chassis 12B have the same structure, and the following describes a structure provided in the vicinity of the inner end portion 42a on the first chassis 12A side.

Figure 4:
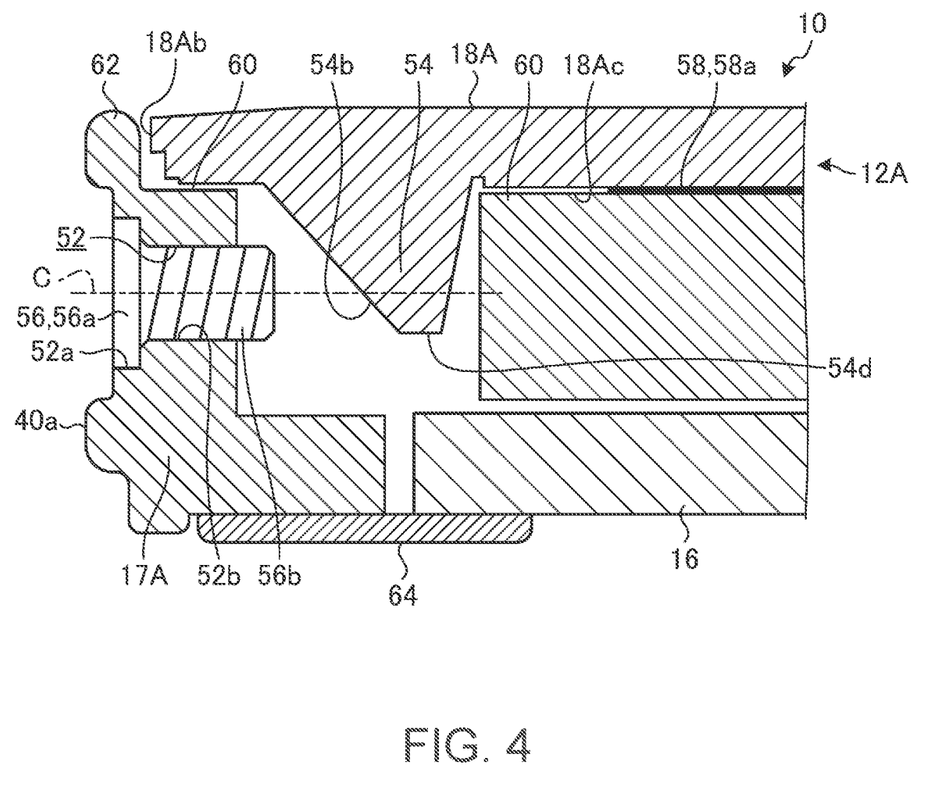
FIG. 4 is a cross-sectional side view of a cover removing mechanism.

FIG. 4 is a cross-sectional side view of the cover removing mechanism 50. As shown in FIGS. 3 and 4, the cover removing mechanism 50 includes a female screw hole 52 formed in the vicinity of the inner end portion 42a on the side wall 40a, and a protruding portion 54 protruding from an inner surface 18Ac of the cover 18A. The female screw hole 52 is closed by screwing a decorative screw 56.

A two-stage counterbore 52a is formed in the outer opening of the female screw hole 52. The decorative screw 56 has a head 56a and a male screw portion 56b. The head 56a abuts on a deep seating surface of the two-stage counterbore 52a, and is in a slightly recessed position so as not to be noticeable in appearance. The head 56a has a color similar to that of the side wall 40a and is formed with a spin cut so as to have a suitable appearance. The male screw portion 56b is relatively short and has a length that does not reach the protruding portion 54.

Figure 5:
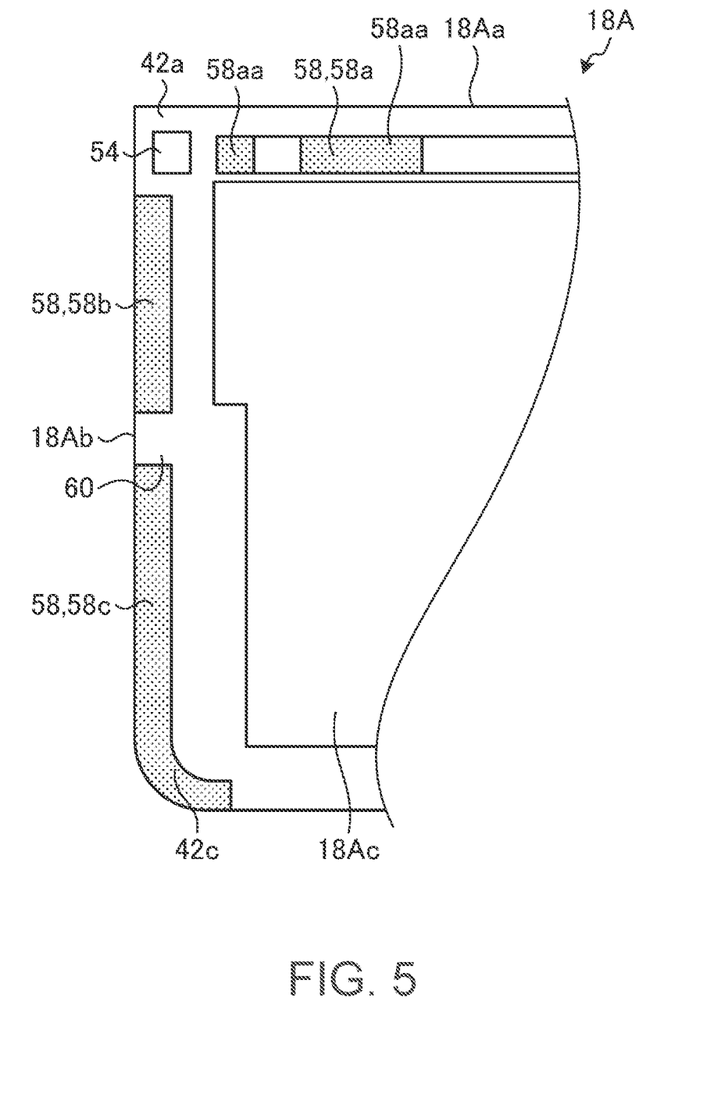
FIG. 5 is a schematic view showing a part of an inner surface of a cover.

FIG. 5 is a schematic view showing a part of the inner surface 18Ac of the cover 18A. As shown in FIG. 5, a lateral side of the cover 18A is defined as a side 18Ab. The side 18Ab is a side along the side wall 44a. In addition, since the protruding portion 54 of the side 18Ab on the opposite side to the inner end portion 42a is a trigger for removing the cover, it is necessary to reduce the area of the adhesive tape around the protruding portion 54 so that the cover can be easily removed. However, the place near the corners of the system was susceptible to shocks, and the range could not be reduced. Therefore, by disposing the protruding portion 54 in the vicinity of the end portion 42a that is less susceptible to an impact and reducing the amount of the adhesive tape around the protruding portion 54 as much as possible, both easy removal and impact resistance have been realized.

The protruding portion 54 is provided in the vicinity of the inner end portion 42a. An adhesive tape (adhesive material) 58 is provided along the edge of the inner surface 18Ac. The adhesive tape 58 is also provided in a range (not shown in FIG. 5). The portion of the adhesive tape 58 having the adhesive is indicated by a dot background, and the portion without the adhesive is indicated by a white background. That is, in the adhesive tape 58a along the side 18Aa, the portion of the reference numeral 58aa has an adhesive, and the other portion is a peeling portion without the adhesive. The portion of the adhesive tape 58a and the reference numeral 58aa with the adhesive is provided at a position avoiding the periphery of the protruding portion 54 and the inner end portion 42a.

The adhesive tape 58b extends from a substantially intermediate portion of the side 18Ab toward the side of the inner end portion 42a, but does not reach the periphery of the protruding portion 54 and the inner end portion 42a. An adhesive tape 58c extends from a substantially intermediate portion of the side 18Ab toward the side of the outer end portion 42c, and is provided so as to include the outer end portion 42c.

By the way, when the electronic apparatus 10 is dropped, the outer end portion 42c and the corner portion 43a (see FIG. 1) often collide with the floor and are susceptible to an impact. Since the outer end portion 42c is susceptible to an impact, the adhesive tape 58c is disposed on the outer end portion 42c so that the cover 18A and the frame member 17A adhere to each other at the outer end portion 42c. For this reason, the cover 18A is less likely to come off at the outer end portion 42c.

On the other hand, since the inner end portion 42a is slightly separated from the corner portion 43a by the width of the hinge device 14 or the like, the inner end portion 42a has a structure that is less likely to receive an impact as compared with the outer end portion 42c. Further, since the inner end portion 42a is substantially in the middle of the left-right direction in FIG. 2 in the 180-degree posture, the inner end portion 42a does not receive a strong impact. For this reason, the adhesive tape 58 is not provided around the inner end portion 42a, and the cover 18A is relatively likely to come off with respect to the frame member 17A. In other words, the protruding portion 54 serves as a trigger for removing the cover, and it is preferable to reduce the area of the adhesive tape 58 around the protruding portion 54 so that the cover can be easily removed. However, since the outer end portion 42c is susceptible to an impact, it is not desirable to reduce the adhesive tape 58. Therefore, the protruding portion 54 is disposed in the vicinity of the inner end portion 42a, which is less susceptible to an impact, and the adhesive tape 58 around the protruding portion 54 is reduced as much as possible. As a result, both easy removal and impact resistance are achieved.

As shown in FIG. 4, a tape sticking stand 60 is provided around the frame member 17A. The cover 18A is adhesively fixed to the tape sticking stand 60 by an adhesive tape 58. There is no tape sticking stand 60 at a place where the protruding portion 54 protrudes.

A low small wall 62 is provided on the edge of the tape sticking stand 60 of the frame member 17A so as to protrude (see also FIG. 3). The small wall 62 covers the periphery of the cover 18A, and a suitable appearance can be obtained without exposing the fore edge of the cover 18A. Further, since the small wall 62 is provided, a flat-blade screwdriver or the like is not inserted between the tape sticking stand 60 and the cover 18A, and the cover 18A is not inadvertently removed. The reference numeral 64 in FIG. 4 is a bezel member that covers the gap between the display 16 and the frame member 17A.

Figure 6:
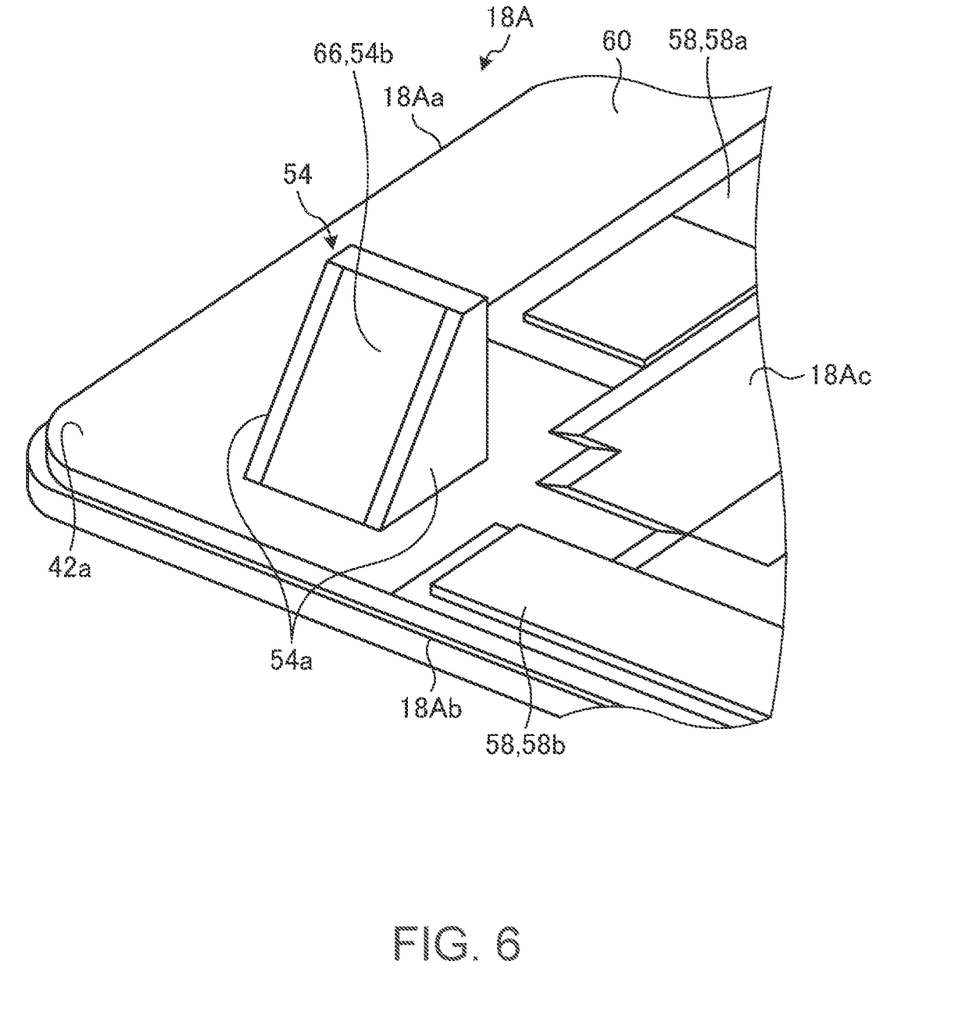
FIG. 6 is a perspective view of a protruding portion and the periphery thereof.
Figure 7:
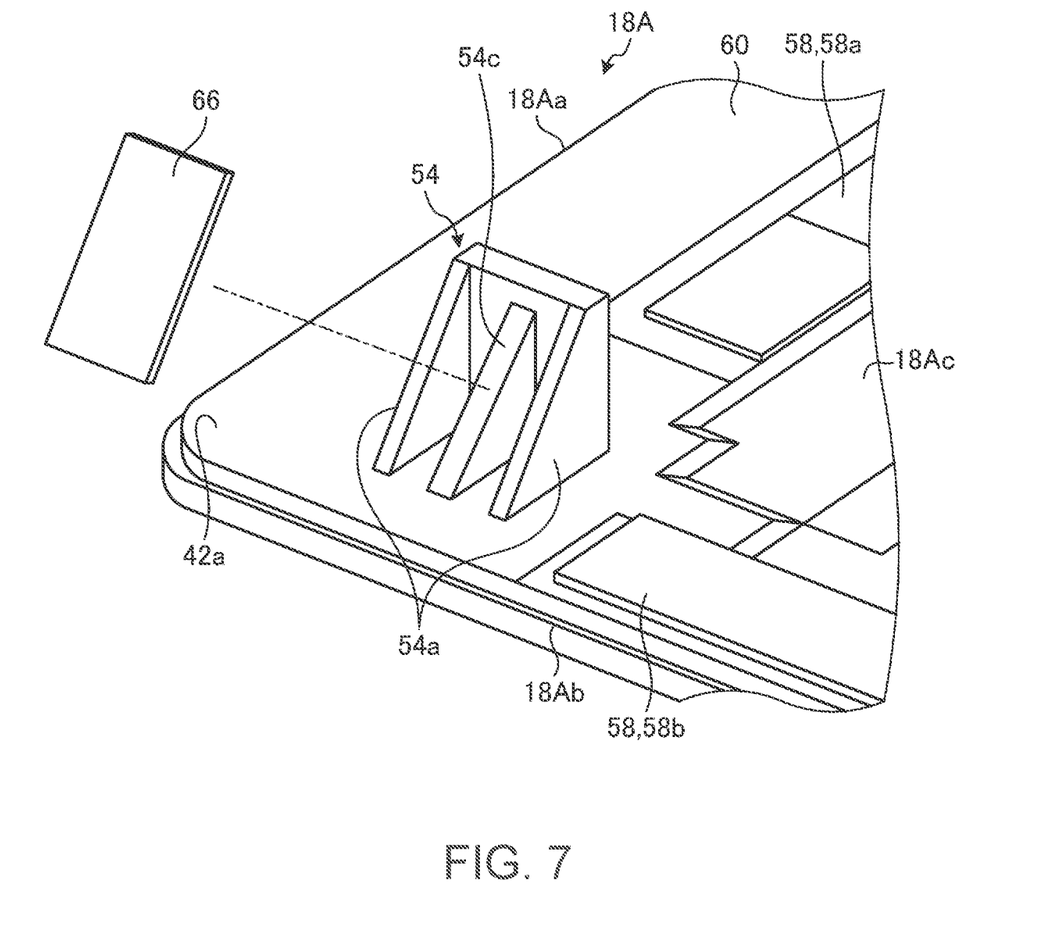
FIG. 7 is a perspective view of the disassembled protruding portion and the periphery thereof.

FIG. 6 is a perspective view of the protruding portion 54 and the periphery thereof. FIG. 7 is a perspective view of the protruding portion 54 obtained by disassembling a resin piece 66 and the periphery thereof. The protruding portion 54 is located at a position slightly separated from the two sides 18Aa and 18Ab. The protruding portion 54 has a substantially square shape when viewed in a plan view (see FIG. 5), and two side surfaces 54a have a shape of a substantially right-angled isosceles triangle, forming an inclined surface 54b. An inclined column 54c slightly smaller than the side surface 54a is provided inside the protruding portion 54. The protruding portion 54 forms an inclined surface 54b when the resin piece 66 is adhesively fixed to the inclined column 54c with an adhesive tape. The resin piece 66 is fitted between the two side surfaces 54a and is stable. A portion of the protruding portion 54 other than the resin piece 66 is made of metal and is integrally molded with the cover 18A. However, the cover 18A may be a composite material in which at least the inner end portion 42a, the protruding portion 54, and the peripheral portion thereof are made of metal, and a resin material is partially used. Further, in a case where the entire cover 18A is made of a resin material depending on the design conditions, the inclined surface 54b may be integrally molded with other portions of the protruding portions 54.

Returning to FIG. 4, the protruding portion 54 and the inclined surface 54b are located at a position sufficiently close to the inner opening of the female screw hole 52 on the extension of the female screw hole 52. The reference numeral C in FIG. 4 is a centerline of the female screw hole 52. The inclined surface 54b is formed on the side of the side wall 40a. The protrusion amount of the inclined surface 54b of the protruding portion 54 increases in a direction away from the side wall 40a (to the right in FIG. 4). The top portion 54d of the protruding portion 54 is at substantially the same height as the edge 52b on the side of the female screw hole 52 beyond a centerline C.

Figure 8:
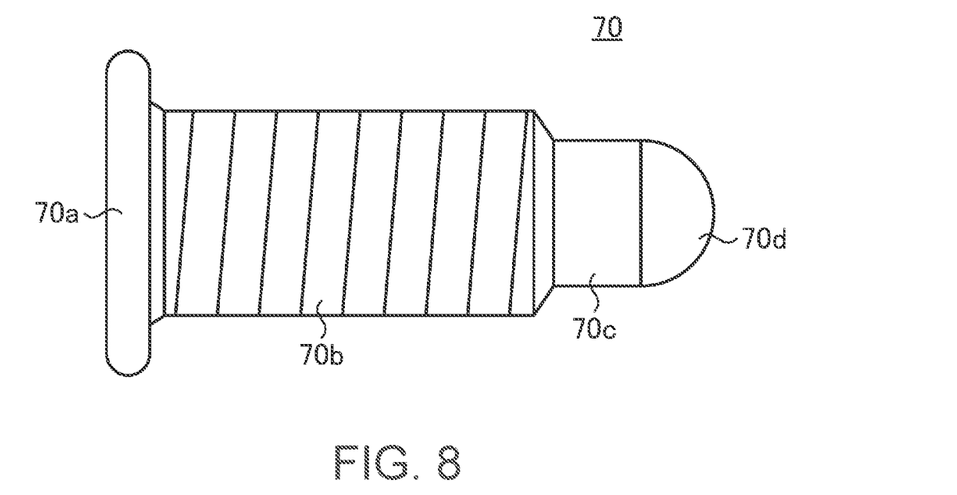
FIG. 8 is a side view of a removal screw.

FIG. 8 is a side view of the removal screw 70. The removal screw 70 is applied to the cover removing mechanism 50 to remove the cover 18A from the frame member 17A. The removal screw 70 is usually carried by a maintenance worker. The removal screw 70 includes a head 70a, a male screw portion 70b protruding from the head 70a and screwed into the female screw hole 52, a cylindrical portion 70c having a diameter smaller than that of the male screw and further protruding from the male screw portion 70b, and a spherical surface portion 70d forming the tip end of the cylindrical portion 70c. The head 70a has the same shape as the head 56a of the decorative screw 56. The male screw portion 70b has the same nominal diameter as the male screw portion 56b of the decorative screw 56, but is slightly longer than the male screw portion 56b. The cylindrical portion 70c is shorter than the male screw portion 56b and has a smooth columnar surface. The spherical surface portion 70d has a hemispherical shape continuous from the cylindrical portion 70c and has a smooth surface.

Figure 9:
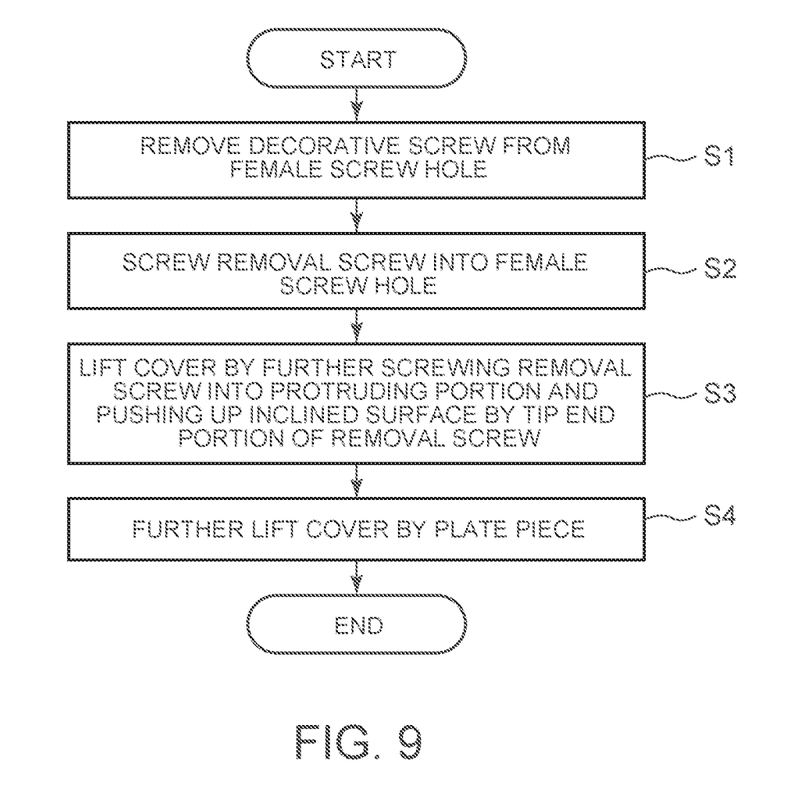
FIG. 9 is a flowchart of a method for applying a removal screw to the cover removing mechanism to remove the cover from a frame member.
Figure 10:
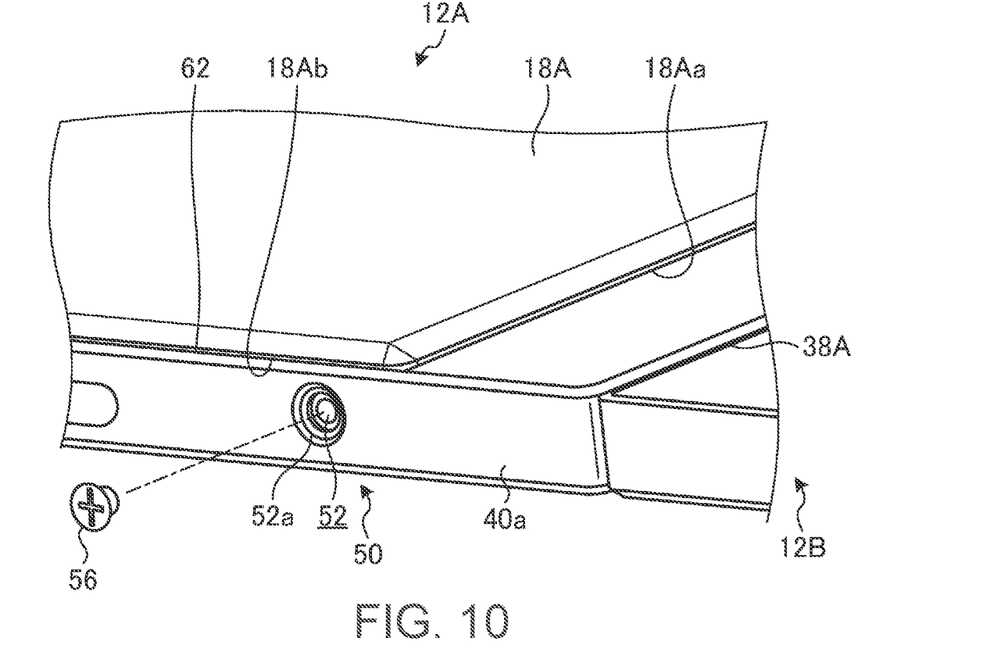
FIG. 10 is a perspective view showing how a decorative screw is removed from a female screw hole.
Figure 11:
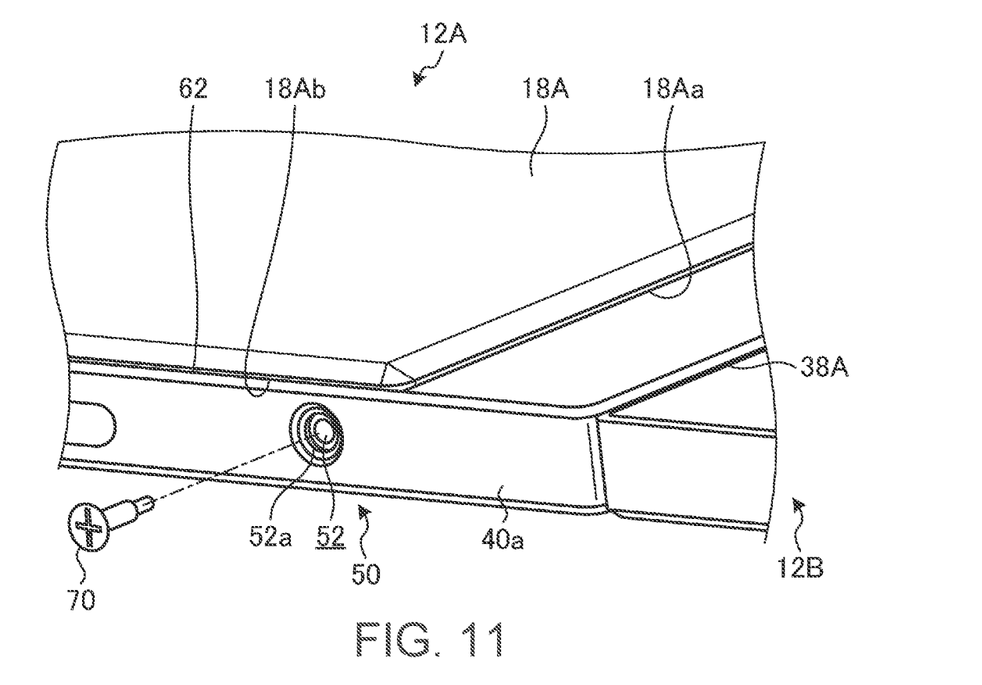
FIG. 11 is a perspective view showing how the removal screw is attached to the female screw hole.
Figure 12:
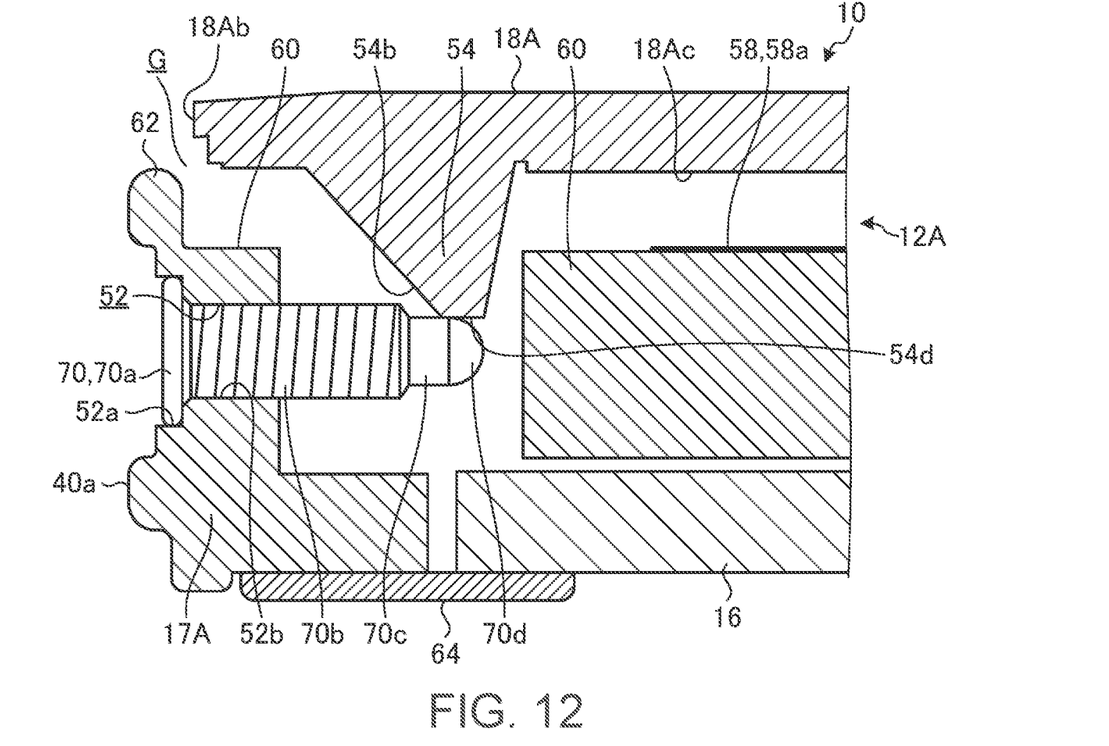
FIG. 12 is a cross-sectional side view showing a state in which an inclined surface is pushed up by a tip end of the removal screw to lift the cover.
Figure 13:
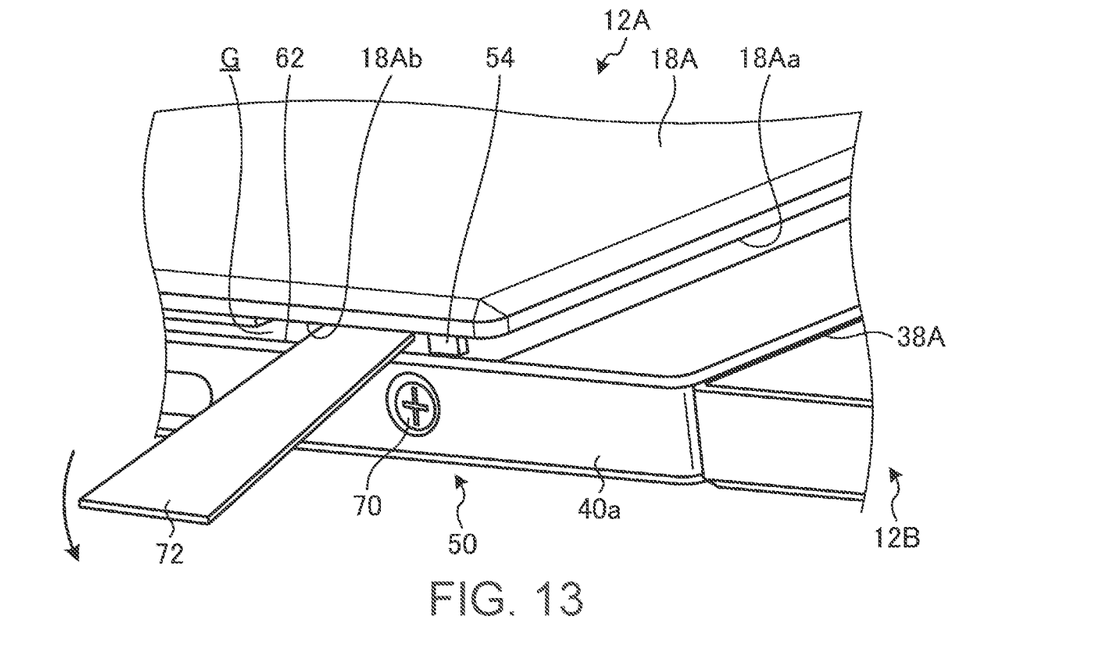
FIG. 13 is a perspective view showing how the cover is further lifted by a plate piece.

FIG. 9 is a flowchart of a cover removing method for removing the cover 18A from the frame member 17A by applying the removal screw 70 to the cover removing mechanism 50. FIG. 10 is a perspective view showing how the decorative screw 56 is removed from the female screw hole 52. FIG. 11 is a perspective view showing how the removal screw 70 is attached to the female screw hole 52. FIG. 12 is a cross-sectional side view showing a state in which the inclined surface 54b is pushed up by the tip end of the removal screw 70 to lift the cover 18A. FIG. 13 is a perspective view showing how the cover 18A is further lifted by the plate piece 72.

First, in step S1 of FIG. 9, as shown in FIG. 10, the decorative screw 56 is removed from the female screw hole 52. In step S2, as shown in FIG. 11, the removal screw 70 is attached to the female screw hole 52, and the removal screw 70 is screwed into the female screw hole 52.

In step S3, as shown in FIG. 12, the removal screw 70 is further screwed into the female screw hole 52. Then, the male screw portion 70b is screwed into the female screw hole 52 until the head 70a abuts on the counterbore 52a, and the inclined surface 54b is pushed up by the spherical surface portion 70d and the cylindrical portion 70c at the tip end to lift the cover 18A. The top portion 54d of the protruding portion 54 rides on the cylindrical portion 70c. The place where the top portion 54d rides on by pushing up the inclined surface 54b may be any place extending from the spherical surface portion 70d to the cylindrical portion 70c.

When the spherical surface portion 70d pushes up the inclined surface 54b, a strong reaction force is generated to some extent because the adhesive tape 58 is peeled off, but since the spherical surface portion 70d has a curved shape and a smooth surface, the inclined surface 54b is hardly damaged. Even if a small amount of chips is generated due to the inclined surface 54b sliding with the spherical surface portion 70d, since the inclined surface 54b is composed of the resin piece 66, the chips are not short-circuited with respect to other electronic elements. Further, at this time, the male screw portion 70b is not in contact with the inclined surface 54b, and the male screw portion 70b does not damage the inclined surface 54b. If the surface of the resin piece 66 is scratched or the like, the resin piece 66 may be replaced.

Then, in step S4, as shown in FIG. 13, the plate piece 72 is inserted into a gap G formed between the cover 18A and the small wall 62 and pushed down as indicated by the arrow, and the cover 18A is further lifted up by the plate piece 72. As a result, the cover 18A is removed from the frame member 17 of the first chassis 12A.

As described above, in the electronic apparatus 10 according to the present embodiment, the removal screw 70 applied to the cover removing mechanism 50 of the electronic apparatus 10, and the cover removing method, the protruding portion 54 is provided on the extension of the female screw hole 52, the protrusion amount of the inclined surface 54b of the protruding portion 54 increases in the direction away from the side wall 40a, and the cover 18A can be appropriately removed from the frame member 17A of the chassis 12A by pressing the tip end of the removal screw 70 on the inclined surface 54b. Since the cover removing mechanism 50 is provided, the cover 18A can be adhesively fixed with the adhesive tape 58, and screwing is not required, and a suitable appearance can be obtained.

Since the removal screw 70 is screwed into the female screw hole 52 by using a driver, a moderately large force is generated and the adhesive tape 58 can be peeled off. The work of screwing the removal screw 70 into the female screw hole 52 is easy, and the cover 18A can be appropriately removed regardless of the skill of the worker. In a state in which the cover 18A is appropriately lifted (see FIG. 12), since the head 70a of the removal screw 70 abuts on the counterbore 52a, the worker can recognize the end timing of the screwing work of the removal screw 70. The worker is prevented from excessively screwing the removal screw 70, the male screw portion 70b does not abut on the inclined surface 54b, and the spherical surface portion 70d at the tip end does not interfere with other components in the chassis. The removal screw 70 is easily removed from the female screw hole 52 by turning in the reverse direction. The removal screw 70 may have a color (for example, red) that is easily distinguished from the decorative screw 56.

The cover removing mechanism 50 is provided in the vicinity of the inner end portion 42a of the hinge device 14, and the inner end portion 42a is in a suitable location for removing the cover 18A because the required amount of the adhesive tape 58 is small compared with the outer end portion 42c (see FIG. 5) on the opposite side.

In the electronic apparatus 10 described above, the first chassis 12A and the second chassis 12B are configured to be foldable by the hinge device 14, and the display 16 is provided across the first chassis 12A and the second chassis 12B, but the present invention is also applicable to a laptop PC, a desktop PC, a smartphone, a portable game machine, and the like. In a laptop PC, a main body chassis including a keyboard and a display chassis including a display are configured to be rotatable by a hinge device, but the present invention is applicable to the removal of the back cover of the main body chassis and the removal of the back cover of the display chassis. Not only the removal screw 70 is applied to the cover removing mechanism 50, but other screws having the same length may be used depending on the situation.

The present invention is not limited to the above-described embodiment, and it goes without saying that the present invention can be freely modified without departing from the gist of the present invention.

The invention claimed is:

1. An electronic apparatus comprising:
a chassis;
a cover fixed with an adhesive material along an edge of the chassis;
a female screw hole in a side wall of the chassis;
a protruding portion protruding from an inner surface of the cover,
wherein the protruding portion has an inclined surface on an extension of the female screw hole and has a protrusion that increases in a direction away from the side wall,
wherein the female screw hole is configured to be closed with a decorative screw having a length that does not reach the protruding portion.

2. The electronic apparatus according to claim 1, wherein the protruding portion is made of metal, and
a resin piece is on the inclined surface.

3. The electronic apparatus according to claim 1, wherein the chassis is a substantially flat rectangular shape,
one edge of the chassis is rotatably connected to another chassis by a hinge,
the cover covers almost an entire surface of one surface of the chassis, and
the female screw hole and the protruding portion are in a vicinity of an end portion of a side along one edge of the cover.

4. The electronic apparatus according to claim 1, wherein the chassis has a wall that covers a periphery of the cover.

* * * * *